US012699867B2

(12) United States Patent
Kim et al.

(10) Patent No.: US 12,699,867 B2
(45) Date of Patent: Aug. 4, 2026

(54) RFID TAG COMPONENT, RFID TAG ASSEMBLY AND OBJECT TO BE IDENTIFIED ATTACHED WITH THE RFID TAG ASSEMBLY

(71) Applicant: SHUYOU (SHANGHAI) Technology CO., LTD., Shanghai (CN)

(72) Inventors: Youngdo Kim, Shanghai (CN); Xiaomeng Ma, Shanghai (CN)

(73) Assignee: SHUYOU (SHANGHAI) Technology CO., LTD., Shanghai (CN)

( * ) Notice: Subject to any disclaimer, the term of this patent is extended or adjusted under 35 U.S.C. 154(b) by 0 days.

(21) Appl. No.: 19/091,619

(22) Filed: Mar. 26, 2025

(65) Prior Publication Data

US 2025/0225360 A1 Jul. 10, 2025

Related U.S. Application Data

(63) Continuation of application No. PCT/CN2022/121743, filed on Sep. 27, 2022.

(51) Int. Cl.
*G06K 19/077* (2006.01)
*G06K 19/07* (2006.01)

(52) U.S. Cl.
CPC ..... *G06K 19/0776* (2013.01); *G06K 19/0723* (2013.01); *G06K 19/07775* (2013.01); *G06K 19/07781* (2013.01)

(58) Field of Classification Search
CPC ........... G06K 19/0776; G06K 19/0723; G06K 19/07775; G06K 19/07781

(Continued)

(56) References Cited

U.S. PATENT DOCUMENTS

2006/0186210 A1 8/2006 Tethrake et al.
2016/0110637 A1 4/2016 Lehovetzki
(Continued)

FOREIGN PATENT DOCUMENTS

CN 102236815 A 11/2011
CN 102306871 A 1/2012
(Continued)

OTHER PUBLICATIONS

PCT International Search Report and Written Opinion, PCT/CN2022/121743, May 17, 2023, 11 pages.
(Continued)

*Primary Examiner* — Allyson N Trail
(74) *Attorney, Agent, or Firm* — Quarles & Brady LLP

(57) ABSTRACT

An RFID tag component, an RFID tag assembly and an object to be identified attached with the RFID tag assembly are disclosed. An RFID tag component includes an insulating ring; a film antenna bonded to the inner peripheral surface of the insulating ring, the film antenna formed by connecting an IC chip with a metal loop antenna, the metal loop antenna being flexible so the film antenna adheres to the inner peripheral surface of the insulating ring along a circumferential direction after being bonded to the inner peripheral surface; and a conducting medium layer adhering to an outer peripheral surface of the insulating ring in the circumferential direction and partially surrounding the insulating ring so a slot is between two ends of the conducting medium layer. The conducting medium layer is inductively coupled with the metal loop antenna to radiate RF signals from the IC chip outwardly through the slot.

15 Claims, 6 Drawing Sheets

(58) Field of Classification Search
USPC ......................................................... 235/492
See application file for complete search history.

(56)                  References Cited

U.S. PATENT DOCUMENTS

| 2022/0019991 A1* | 1/2022 | Rezayee | .............. G06Q 20/352 |
| 2024/0338549 A1* | 10/2024 | Lin | ...................... H01Q 1/2208 |
| 2025/0225360 A1* | 7/2025 | Kim | ................ G06K 19/07781 |

FOREIGN PATENT DOCUMENTS

| CN | 103164735 A | 6/2013 | |
| CN | 104978594 A | 10/2015 | |
| CN | 107808186 A | 3/2018 | |
| EP | 1420477 A1 | 5/2004 | |
| WO | WO-2016078496 A1 * | 5/2016 | .............. H01Q 1/38 |

OTHER PUBLICATIONS

Son et al., Flexible wideband Uhf Rfid tag antenna for curved metal surfaces, Electronic Letters, Jun. 21, 2012, 48 (13):749-750.
Ziai et al., Curved RFID tags for metallic gas cylinders, Electronic Letters, Aug. 13, 2009, 45(17): 867-869.
European Patent Office, Extended Search Report, Application No. 22948954.7, Mar. 20, 2026, 10 pages.

* cited by examiner

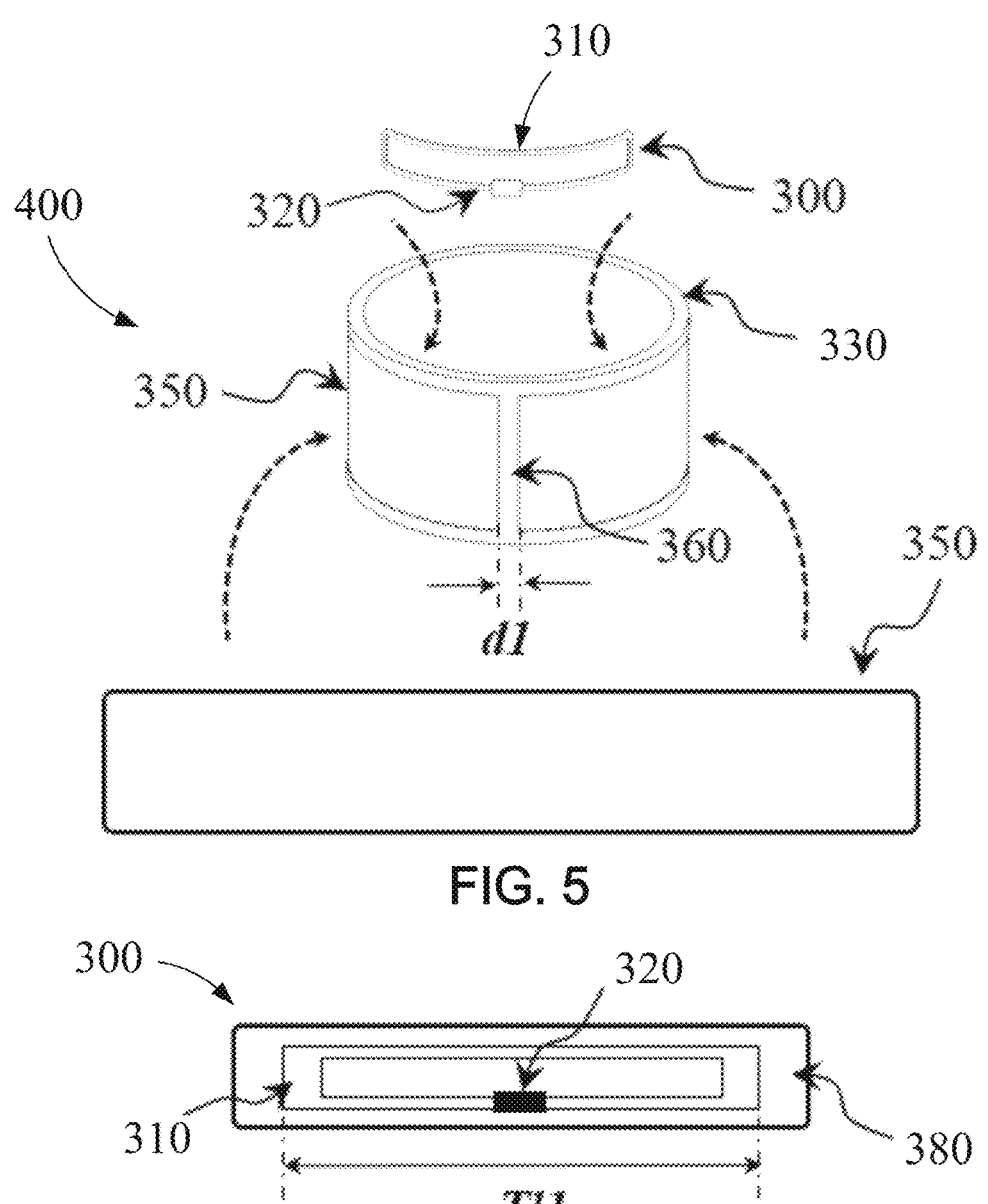
FIG. 5
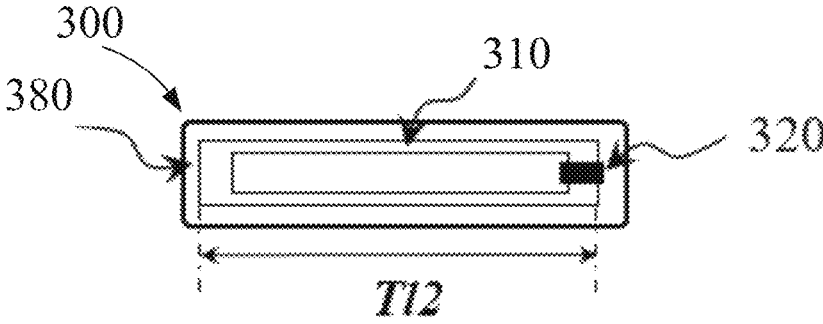
FIG. 6a
FIG. 6b

Far field Directivity Abs (Theta=270)

Phi/Degree vs. dBi

Far field Directivity Abs (Phi=270)

Theta/Degree vs. dBi

RFID TAG COMPONENT, RFID TAG ASSEMBLY AND OBJECT TO BE IDENTIFIED ATTACHED WITH THE RFID TAG ASSEMBLY

CROSS REFERENCE TO RELATED APPLICATION

This application is a continuation application of PCT International Patent Application No. PCT/CN2022/121743 filed on Sep. 27, 2022. The contents of that application are incorporated by reference herein in their entirety for all purposes.

FIELD

The present invention relates to the field of radio frequency identification, and more specifically, to a radio frequency identification (RFID) tag component, an RFID tag assembly adapted to a tool, and an object to be identified attached with the RFID tag assembly.

BACKGROUND

An RFID system typically transmits or receives data through a contactless wireless RF channel by an RFID tag containing asset information, identifies product and asset information at an RFID reader, and utilizes a network to enable a host computer or a dedicated server to use the product and asset information in an application program through middleware. RFID technology improves efficiency and degrades costs for related businesses included in the supply chain management (SCM).

In order to meet the needs to be realized in various industry fields, RFID tags may be manufactured into various sizes and structures, with different materials. And in order to improve durability and meet the mechanical strength requirements of the tools themselves, metal materials are generally used. In addition, due to the diversity of the structures of the tools, it is difficult to apply RFID tags with a uniform structure to different tools. Thus, it is necessary to develop the most suitable special purpose RFID tags for different tools.

Attaching ultra-small RFID tags made of ceramic and PCB materials to the surfaces of most tools enhances durability of tags and improves appearance, and an individually designed plastic shell protects the RFID tags from the external environment.

FIG. 1a shows a schematic view of a tool whose surface is processed to attach an ultra-small RFID tag. FIG. 1b shows a schematic view of another tool whose surface is processed to be planar to attach an ultra-small RFID tag. By bringing the ground planes of the RFID tags 150,150' to directly contact with and attach to the planar regions 110, 110' of the metal tools, metal tools 100,120 of various shapes themselves serve as the ground for the RFID tags 150,150'.

In order to minimize the influence on the mechanical strength of the tools and to reduce processing costs, the smaller the planar regions 110,110', the better. However, such structure exhibits disadvantages of a reduction in impedance bandwidth due to tag miniaturization and a change in tag performance as the attaching position of the tag on one side of various metal tools varies. The narrowed impedance bandwidth reflects tag manufacturing and attaching position errors on tag performance sensitively, thus requiring tag mass production and tools attachment to be very precise, which will make it difficult to control tag attaching position deviations and process errors that may occur during manufacturing.

In addition, when tools are attached with block-shaped RFID tags, due to the limited space and curved surface structure of tools, it is necessary to process one side surface of the tools into a planar spatial structure for attaching RFID tags, or to process the tools to have a cavity structure for burying tags therein. Such additional production processes increase the cost of introducing the RFID system. It also has a serious impact on the mechanical strength and durability of the tools themselves, and there may be cases that processes cannot be carried out due to difference between the tools.

When an ultra-small RFID tag is attached to one side of the tools, the metal tool will serve as electrical ground for the antenna of RFID tag, whereby the maximum radiation gain of the tag is directed to the front direction where the tags are attached, and only a relatively small radiation gain is in the opposite direction. The radiation gain of the antenna of the RFID tag will vary as the rotation direction of the tool changes, and the radar scattering cross-section (RCS) for obtaining the maximum readable identification range appears to vary greatly with the rotation direction of the tool. Therefore, the reading performance of the RFID tag at different angles varies greatly.

As such, it is necessary to consider the structural characteristics of tools, improve the electrical performance of RFID tags, reduce the identification rate change sensitive to the identification direction of the tags, and fundamentally solve the waterproof/dustproof problem of the tags to improve the durability of RFID tags.

SUMMARY

The present invention aims to overcome the above problems in the prior art. Considering the usage environment and structural characteristics of the tools, an RFID tag assembly having a user-friendly appearance structure and being capable to improve the directivity and electrical characteristics of the RFID tag antenna is provided. The RFID tag assembly proposed by the present invention enables a design variable controlling the impedance of the IC chip and a design variable controlling the radiation gain of the RFID tag antenna to be independently controlled, thereby enabling the RFID tag assembly to be widely used for various sizes of tools and providing design flexibility.

According to a first aspect of the present invention, there is provided an RFID tag component comprising: an insulating ring; a film antenna bonded to the inner peripheral surface of the insulating ring, the film antenna formed by connecting an IC chip with a metal loop antenna, the metal loop antenna being flexible such that the film antenna adheres to the inner peripheral surface of the insulating ring along a circumferential direction after being bonded to the inner peripheral surface; and a conducting medium layer adhering to an outer peripheral surface of the insulating ring in the circumferential direction and partially surrounding the insulating ring such that there is a slot between two ends of the conducting medium layer, wherein the conducting medium layer is inductively coupled with the metal loop antenna to radiate radio frequency signals from the IC chip outwardly through the slot.

In the structure in which there is a slot between the two ends of the conducting medium layer as described above, the electric field excited by the film antenna is concentrated at the slot of the conducting medium layer. The electric field may be used as a source to achieve a radiation gain of the RFID tag component. In addition, by scattering the electric field distribution of the conducting medium layer concentrated in the slot, there is an advantage of expanding the impedance bandwidth of the RFID tag. A structure with a slot between both ends of the conducting medium layer is considered as a long-range radiation slot. In order to increase the radiation slot in a physically confined space, slit(s) is provided in at least one end region of the conducting medium layer, whereby it may be used as a design variable to increase the radiation gain and improve the impedance bandwidth of the conducting medium layer of the RFID tag component.

According to a second aspect of the present invention, there is provided an RFID tag assembly for adapting tools, comprising: the RFID tag component of the preceding, and an annular jacket formed of an insulating material, the jacket having an inner layer, an outer layer, and an annular cavity between the inner layer and the outer layer for conformally accommodating the RFID tag component.

By using such a jacket and the RFID tag component conformally accommodated therein, it is able to protect the RFID tag component from external harsh environments and protect the RFID tag component in case of impact or drop, thereby improving the durability of the RFID tag component.

According to a third aspect of the present invention, there is provided an object to be identified, a portion of which is externally surrounded by the RFID tag assembly of above.

The RFID tag proposed by the present invention is implemented to surround small assets (such as socket tools) of various sizes and shapes from outside, thereby improving the radiation characteristics of the RFID tag and enabling better compatibility with the shapes of existing tools.

The RFID tag assembly provided by the present invention inserts the RFID tag component into the jacket structure surrounding the tools and seals it, thereby providing a method capable of solving the problems of water and dust resistance. In addition, in order to solve the defect that existing RFID tags for tools are sensitive to directionality, a two-layer structure and an inductive coupling are employed so that the radiation characteristics of the RFID tags do not sensitively change with the size of the tools and provide consistent characteristics in all directions with reference to the interface of the tools. The above characteristics enable the RFID tag to provide better tag identification performance even when it is densely placed in a limited space together with other tools in an actual tool usage environment, so as to build a stable RFID system.

Other characteristics and aspects will become clear through the following detailed description, drawings and claims.

DESCRIPTION OF THE DRAWINGS

In order to illustrate the embodiments of the present invention or the technical solutions in the prior art more clearly, the drawings needed to be used in the description of the embodiments or the prior art will be briefly introduced below. It is apparent that drawings in the following description are some embodiments of the present invention. For those of ordinary skill in the art, it is possible to obtain other drawings based on these drawings without exerting creative efforts, wherein:

FIG. 5 shows an exploded view of an RFID tag component in an embodiment of the present invention.

FIGS. 6a and 6b show schematic views of film antennas with IC chips positioned at different locations of the film antennas and having different circumferential spans in optional embodiments of the present invention.

DETAILED DESCRIPTION

Figure 1A:
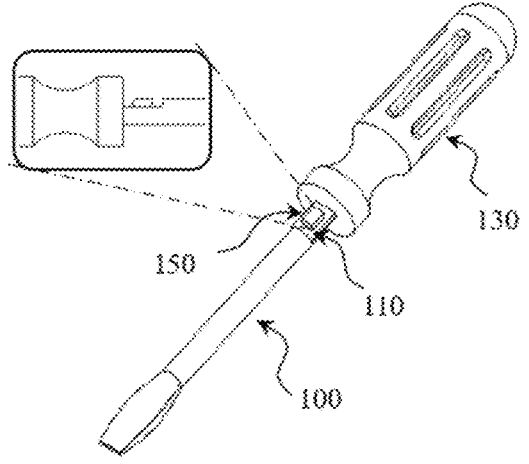
FIGS. 1a and 1b show schematic views of tools of prior art whose surfaces are attached with an ultra-small RFID tags.
Figure 1B:
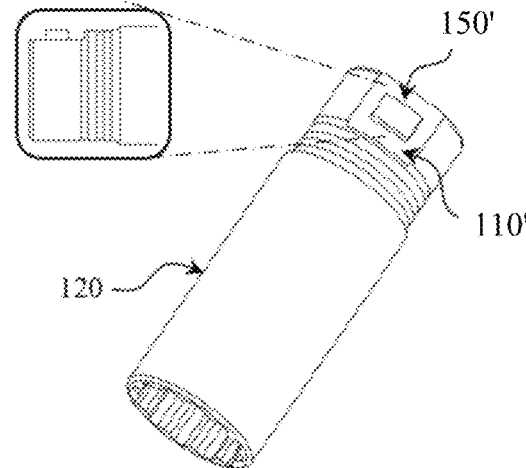

In order to make the aforementioned objects, characteristics and advantages of the present invention more readily understood, a detailed description of the embodiments of the present invention will be given in conjunction with the accompanying drawings.

Many specific details are set forth in the following description so that the present invention can be fully understood. However, the present invention can also be implemented in other ways different from those described herein. Those skilled in the art can make similar generalizations without departing from the connotation of the present invention. Therefore, the present invention is not limited to the specific embodiments disclosed below.

Secondly, the present invention will be described in detail in conjunction with schematic diagrams. When describing the embodiments of the present invention in detail, for the convenience of explanation, the cross-sectional diagrams showing the device structure will not be partially enlarged according to the general scale, and the schematic diagrams are described only as examples and should not limit the protection scope of the present invention. In addition, the three-dimensional special dimensions of length, width and depth should be included in actual production.

Specific implementations of the present invention will be described below, and it should be noted that, in the detailed description of these implementations, not all features of the actual implementations are described in detail in this description for the sake of brevity and conciseness of the description. It should be understood that, in the actual practice of any one of the implementations, just as in the course of any engineering project or design project, in order to achieve the developers' specific goals and to meet system-related or business-related restrictions, a variety of concrete decisions are often made, and this varies from one implementation to another. In addition, it should also be understood that, although the effort made in such developing process may be complex and time-consuming, some variations such as design, manufacture and production made on the basis of the technical contents disclosed in the present disclosure are just conventional technical means in the art for one of ordinary skilled in the art associated with the technical contents disclosed in the present disclosure, and the present disclosure should not be construed as insufficient.

Unless otherwise defined, technical or scientific terms used in the claims and the description should have the ordinary meaning understood by one of ordinary skills in the art which the present invention belongs to. Words "first", "second" and the like used in the description and claims of the present invention do not imply any order, quantity, or importance, but are merely used to distinguish different components. Words "one", "a/an" and the like do not imply any quantitative limitation, but rather mean "at least one". Words "including", "comprising" and the like mean that a component or item appearing before "including" or "comprising" contains a component or item and its equivalents listed after "including" or "comprising" and does not exclude other components or items. Words "connected", "coupled" and the like are neither limited to physical or mechanical connections, nor limited to direct or indirect connections.

In the present disclosure, unless otherwise specified, all implementations and preferred implementations mentioned herein may be combined with each other to form new technical solutions. In the present disclosure, unless otherwise specified, all technical features and preferred technical features mentioned herein may be combined with each other to form new technical solutions.

In the description of the implementations of the present application, the term "and/or" is only to describe an association relationship of associated objects, indicating that there may be three kinds of relationships. For example A and/or B may indicate three cases: A alone, A and B simultaneously, and B alone. In addition, the character "/" herein generally indicates that the previous and latter associated objects are in an "or" relationship.

The present invention provides a passive RFID tag used in efficient management of assets in application sites and a computerized and stable system construction for tools loss management by mounting RFID tags on small tools. To achieve this object, the present invention solves the problem of cumbersome attachment of tags and improves the appearance shape by utilizing an insulating double-layer jacket surrounding the tools from outside. In one embodiment, the tools or portions of the tools surrounded by the jackets may be a socket, a screwdriver, a wrench, or the like. In one embodiment, the tools may be made of metal. In order to implement the RFID tags of the present invention, an electrically coupled film antenna is provided within the insulating jacket, thereby improving the omni-directional tag identification performance and making the jacket widely applicable to tools of various sizes/radii.

Figure 2A:
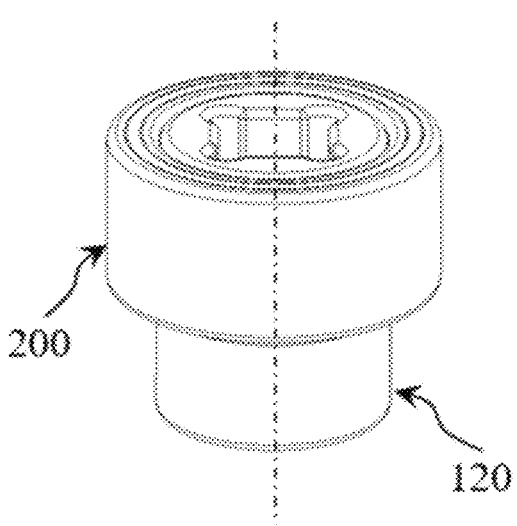
FIGS. 2a and 2b show schematic views of combining an RFID tag assembly to the exterior of a tool in an embodiment of the present invention.
Figure 2B:
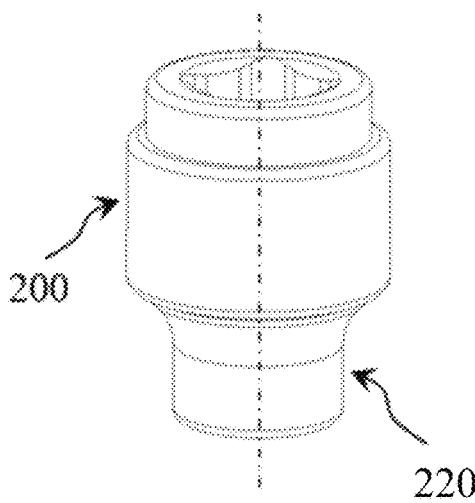

FIGS. 2a-2b show schematic views of combining an RFID tag assembly 200 to the exterior of a tool 220 in an embodiment of the present invention. The tool 220 may have a curved outer surface and there may be an RFID tag component in the RFID tag assembly 200. The inner diameter of the RFID tag assembly 200 may be variable to be adjusted to optimally match the outer diameter of the tool 220, so that the RFID tag assembly 200 may be tightly enclosed outside the tool 220. In one embodiment, the portion of the tool 220 at which the RFID tag assembly 200 is to be disposed may be cylindrical. The portion of the tool 220 at which the RFID tag assembly 200 is to be disposed may also be other shapes, the radial cross-section of which may be elliptical, polygonal (e.g., quadrilateral, hexagonal, octagonal), axial symmetric, central symmetric, irregular shape, and the like.

Figure 3:
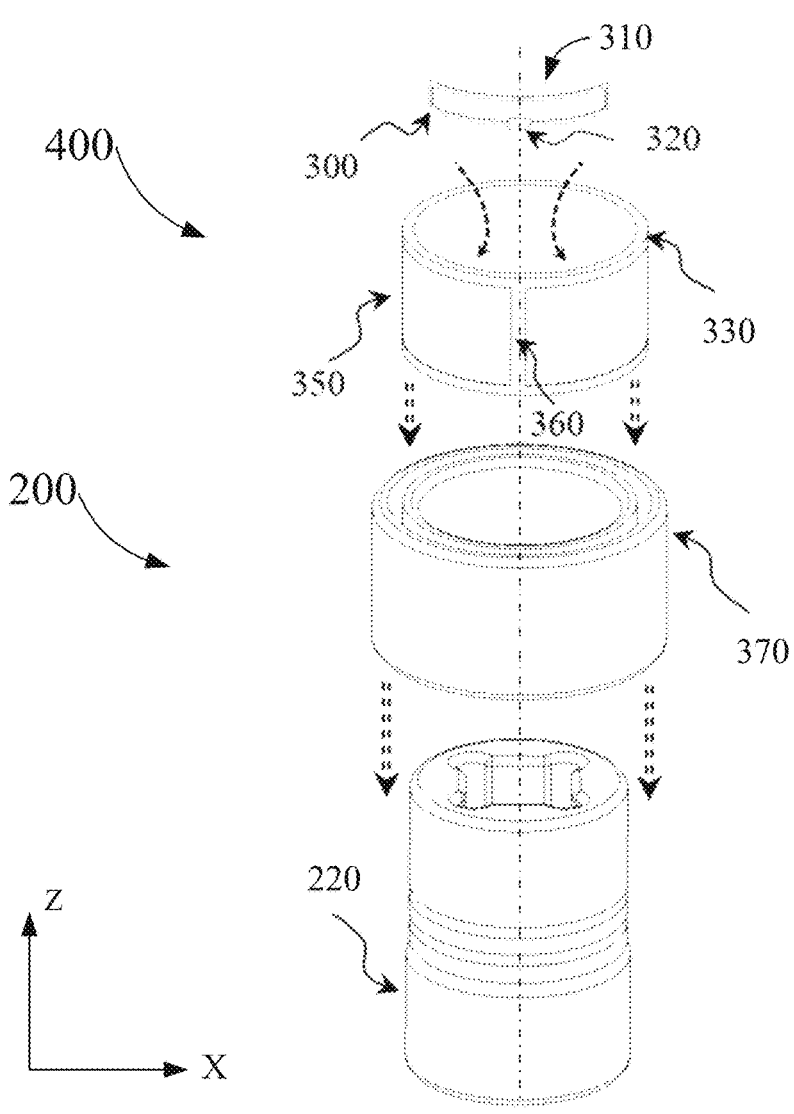
FIG. 3 shows an exploded view of an RFID tag assembly in an embodiment of the present invention.

As shown in FIG. 3, in an embodiment of the present invention, the RFID tag assembly 200 is attached to the tool 220 in a manner of surrounding the tool 220 from outside without any processing to the surfaces of the tool 220. The RFID tag assembly 200 containing an RFID tag component 400 therein (see FIG. 4) may be uniformly and stably mounted to the tool 220 by mechanical force with a jig and a mounting apparatus, such that the RFID tag assembly 200 is tightly combined with the tool 220.

Figure 4:
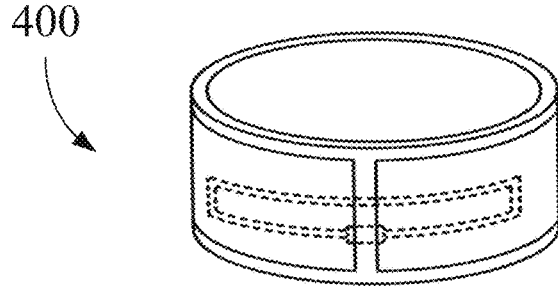
FIG. 4 shows a stereo perspective view of an RFID tag component in an embodiment of the present invention.

As shown in FIG. 3 and FIG. 4, the RFID tag assembly 200 may be separated into an annular jacket 370 and an RFID tag component 400. The annular jacket 370 may be formed of insulating materials, such as plastic. The annular jacket 370 may be formed to have an inner layer and an outer layer with an annular cavity therebetween. The annular cavity may be used to conformally accommodate the RFID tag component 400. Although the RFID tag assembly 200 is shown as a ring shape in the figure, it will be understood by those skilled in the art that the term "annular" as described herein is not limited to a ring shape, but may encompass various shapes that may surround various shaped tools, for example, the radial cross section of the RFID tag assembly 200 may be elliptical, polygonal (such as quadrilateral, hexagonal, octagonal), axial symmetric, central symmetric or irregular shape, and the like.

The RFID tag component 400 may include an insulating ring 330, a conducting medium layer 350, and a film antenna 300. The film antenna 300 may be formed by connecting the IC chip 320 with the metal loop antenna 310. In one embodiment, the IC chip 320 may operate in the UHF band. In one embodiment, the conducting medium layer 350 may be made of metal. The metal loop antenna 310 may be flexible so that the film antenna 300 may be adhered to the inner circumferential surface of the insulating ring 330 along the circumferential direction, and the conducting medium layer 350 may be flexible so that the conducting medium layer 350 may be adhered to the outer circumferential surface of the insulating ring 330 along the circumferential direction. In order to protect the IC chip 320, after the metal loop antenna 310 is connected with the IC chip 320, epoxy resin molding is employed for protection, so that the IC chip portion of the film antenna 300 has a certain thickness. In order to mount the relatively thick molding-protected portion of the IC chip 320 within the annular jacket 370, a groove or cavity may be provided on the inner peripheral surface side of the insulating ring 330 or within the annular jacket 370 to accommodate the molded portion of the IC chip 320.

In one embodiment, the conducting medium layer 350 may be made of a thin metal sheet, such as aluminum and copper foil. The conducting medium layer 350 may partially surround the insulating ring 330 when the conducting medium layer 350 is adhered to the outer peripheral surface of the insulating ring 330, such that there is a slot 360 between the two ends of the conducting medium layer 350, in FIG. 3. The insulating ring 330 may have a certain thickness such that the film antenna 300 and the conducting medium layer 350 may be inductively coupled across the insulating ring 330. In order to be inductively coupled with the conducting medium layer 350, the metal loop antenna 310 may be formed to extend a certain distance along the circumferential direction and the axial direction of the insulating loop 330, respectively, and may be connected with the IC chip 320 to form the film antenna 300. Optionally, the substrate of the film antenna 300 may be a polyimide material (indicated by 380 in FIGS. 6a and 6b), adhering the film antenna 300 to the inner peripheral surface of the insulating ring 330 by various means.

In one embodiment, in order to concentrate the maximum electric field at the conducting medium layer 350 having the slot 360 on the outer peripheral surface of the insulating ring 330, the central region of the film antenna 300 and the slot 360 between both ends of the conducting medium layer 350 may be inductively coupled by a distance in the radial direction (i.e., spaced by the insulating ring 330). That is to say, the slot 360 on the outer peripheral surface of the insulating ring 330 may be positioned to cover the center of the film antenna 300 on the inner peripheral surface of the insulating ring 330 in the radial direction. As such, the slot 360 between the two ends of the conducting medium layer 350 may essentially serve as a long-range radiation slot of the RFID tag component 300. The IC chip 320 of the film antenna 300 may be positioned at the center of a portion of the metal loop antenna 310 extending along the circumferential direction. When the film antenna 300 is formed in a substantially rectangular shape, the IC chip 320 is connected to the metal loop antenna 310 at the midpoint position of the long side of the rectangle. In FIG. 5, the circumferential width of the slot 360 is d1, but the circumferential width d1 of the slot 360 varies depending on the size of the outer diameter of the insulating ring 330. The circumferential width d1 of the slot 360 does not exceed half of the circumferential span of the film antenna 300 extending along the circumferential direction. In a preferred embodiment, the circumferential width d1 of the slot 360 is in a range of 1 mm to 2 mm. Although the slot 360 is shown in FIGS. 3, 4, and 5 as a linear type extending along the axial direction (the Z-axis direction in FIG. 3), the slot 360 may be of other shapes. For example, the slot 360 may be formed to extend in an inclined direction with respect to the axial direction on the outer peripheral surface of the insulating ring 330, or both axial short sides of the conducting medium layer 350 constituting the slot 360 may be curved, or one is curved while the other is straight.

As in FIG. 5, the conducting medium layer 350 is made of a thin metal sheet substantially having a rectangular shape and covers substantially the entire outer peripheral surface of the insulating ring 330. As long as the conducting medium layer 350 is able to perform the function of radiating wireless signals outwardly according to the present invention, the shape thereof may be alternatively selected. For example, the conducting medium layer 350 may be an irregular rectangular with an outer contour adjusted according to the outer shape of the tool, for example, to provide depressions on its long or short sides, or transforming the straight lines to curved lines completely/partially. In addition, although the axial long side of the conducting medium layer 350 is shown to be spaced apart from the end edge of the insulating ring 330 by a certain distance, the conducting medium layer 350 may be provided as not to be spaced apart by a certain distance, but to cover the entire axial length of the insulating ring 330, leaving only the slot 360. Of course, it is also possible to reduce the area of the conducting medium layer 350 covering the insulating ring 330 as long as it is capable of radiating wireless signal outward at a desired power.

The impedance of the film antenna 300 is changed by adjusting the circumferential span of the portion of the metal loop antenna 310 extending along the circumferential direction and/or the axial span of the portion of the metal loop antenna 310 extending along the longitudinal axial direction, so that the impedance of the film antenna 300 matches the impedance of the IC chip 320. The electric field excited at a particular center frequency may form a maximum value at the conducting medium layer 350 having a slot 360 on the outer peripheral surface, and the slot 360 may serve as a radiation slot of the RFID tag component 400. The RFID tag component 400 inductively coupled in such two-layer structure enables its electrical characteristics to be less sensitive to structural changes of the tool 200 and provides design flexibility which enables respective control of the impedance and radiation gain of the RFID tag component 400.

FIGS. 6a and 6b show schematic views of IC chips positioned at different locations of metal loop antennas and the metal loop antennas having different circumferential spans in optional embodiments of the present invention. In this embodiment, the metal loop antenna 310 has a rectangular shape, although the metal loop antenna 310 may have other shapes. In FIG. 6a, the IC chip 320 is positioned at the center of the portion extending along the circumferential direction of the rectangular metal loop antenna 310, and the length of the metal loop antenna 310 extending along the circumferential direction is TI1. In FIG. 6b, the IC chip 320 is positioned at the center of the portion extending along the axial direction of the rectangular film antenna 300, and the length of the film antenna 300 extending along the circumferential direction is TI2. The IC chip 320 in FIGS. 6a and 6b is at the center of the circumferential portion and the center of the axial portion of the film antenna 300 as preferred embodiments, the IC chip 320 certainly may bond with the metal loop antenna 310 at other positions to form the film antenna 300.

The length of the metal loop antenna 310 in the circumferential direction (e.g., TI1 and TI2) may control the impedance of the RFID tag component 400 to match the impedance of a particular IC chip, which is one of important design variables of the RFID tag component 400. In the case that the length of the metal loop antenna 310 in the axial direction is constant, the real component of the impedance of the RFID tag component 400 increases as the length of the metal loop antenna 310 in the circumferential direction (e.g., TI1 and TI2) increases. Thus, by controlling the length of the metal loop antenna 310 in the circumferential direction, the impedance of the RFID tag component 400 may be effectively controlled to match the impedance of various IC chips 320.

Due to the curved surface characteristics of the insulating ring 330, the region of the IC chip 320 in the film antenna 300 is subjected to mechanically stress as the film antenna 300 adheres to the inner surface of the insulating ring 330. Thus, by positioning the IC chip 320 in a portion extending along the axial direction in the film antenna 300, it is possible to reduce stress applied to the IC chip 320 due to attachment to the curved surface.

Those skilled in the art will appreciate that the function of the RFID tag component of the present invention may be realized even if the IC chip 320 is offset from the slot 360 formed by the conducting medium layer 350 adhered on the outer peripheral surface of the insulating ring 330 in the radial direction, or the center of the film antenna 300 is offset from the slot 360 in the radial direction. Further, by positioning the IC chip 320 at a region beyond the center of the portion circumferentially extending in the film antenna 300, the IC chip 320 may be offset from the slot 360 formed by the conducting medium layer 350 adhered on the outer circumferential surface of the insulating ring 330 in the radial direction, thereby providing a more flexible way of impedance matching.

Different positions of the IC chip 320 and the different relative positions of the film antenna 300 with respect to the slot 360 on the outer peripheral surface of the insulating ring 330, as exemplarily shown in FIGS. 6a-6b, provides a method capable of changing the position of the IC chip 320 depending on the size or diameter of the tools to reduce the risk of bending of the IC chip 320 and capable of changing the electrical variables of the RFID tag component 400.

Figure 7A:
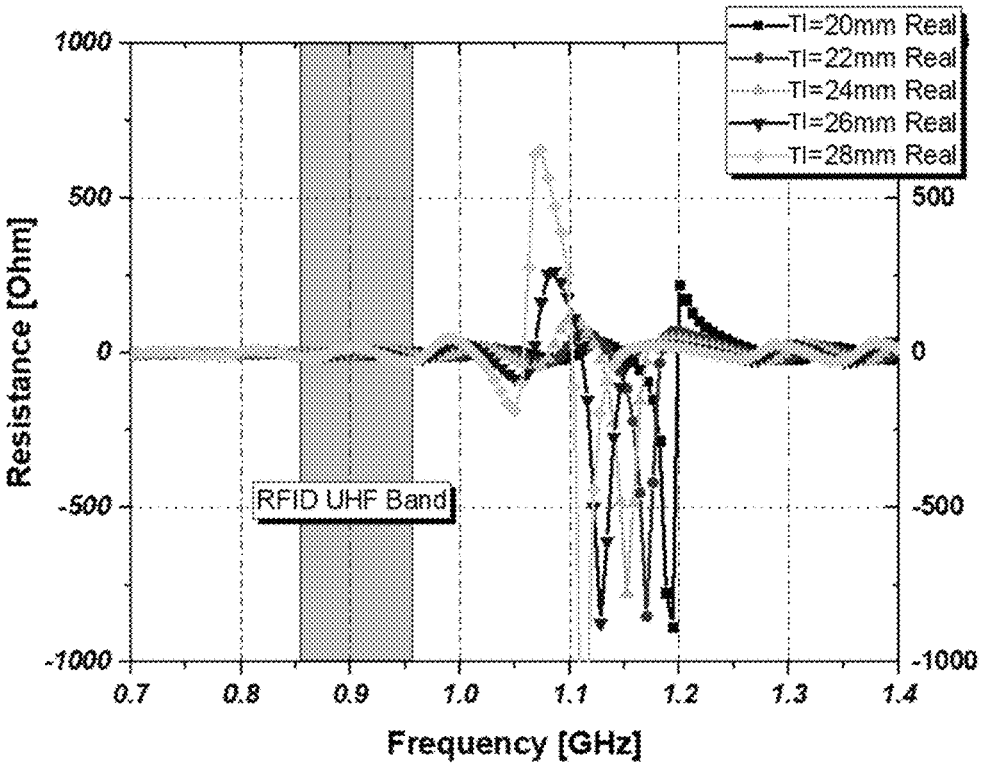
FIGS. 7a and 7b show graphs of real components and imaginary components of the input impedance according to the circumferential spans of the film antenna, respectively, in embodiments of the present invention.
Figure 7B:
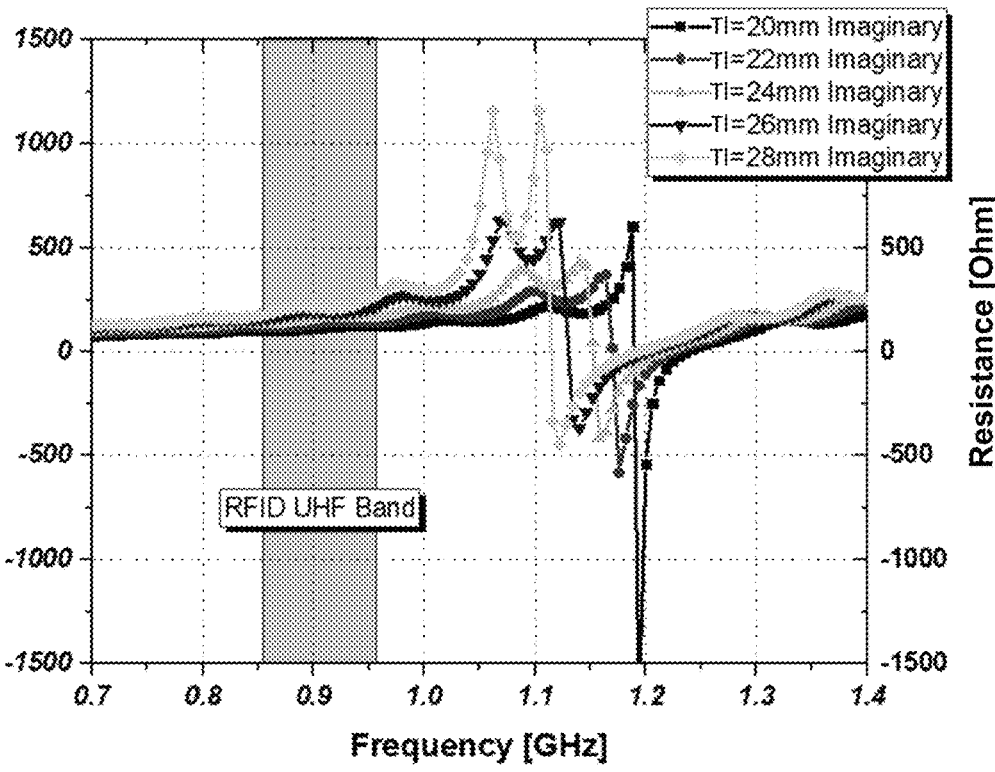

FIGS. 7a and 7b show graphs of real components and imaginary components of the input impedance according to the circumferential spans of the metal loop antenna 310 (TI1 in FIGS. 6a and TI2 in FIG. 6b) in an embodiment of the present invention respectively. In FIGS. 7a and 7b, the real component and the imaginary component of the input impedance as the circumferential span of the metal loop antenna 310 gradually changing from 20 mm to 28 mm at intervals of 2 mm while the axial length of the metal loop antenna 310 is fixed at a specific length respectively. As the circumferential span of the metal loop antenna 310 increases, the resonant frequency of the RFID tag component 400 may change from 1.2 GHz to 1.1 GHz. This characteristic may be used to adjust the imaginary component of the input impedance of the RFID tag component 400 in the frequency band of the RFID tag component 400 to achieve complex impedance matching of the RFID tag component 400. The decrease in the resonant frequency of the RFID tag component and the increase in the imaginary component of the input impedance as the circumferential span of the metal loop antenna 310 increases are regular and linear and may be advantageously used to control the electrical performance of the RFID tag component 400.

Figure 8A:
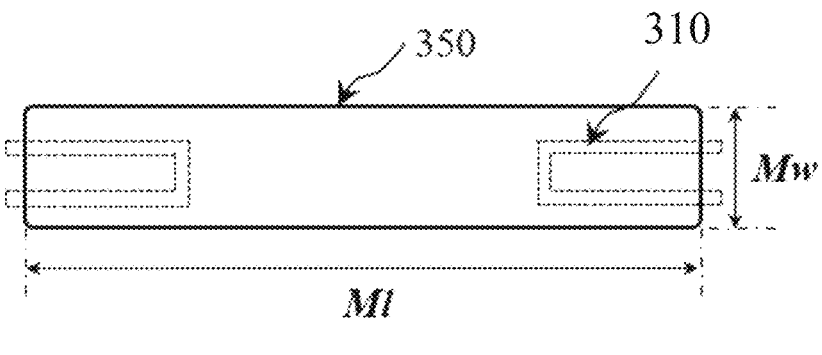
FIG. 8a shows a schematic view of a conducting medium layer in an embodiment of the present invention.
Figure 8B:
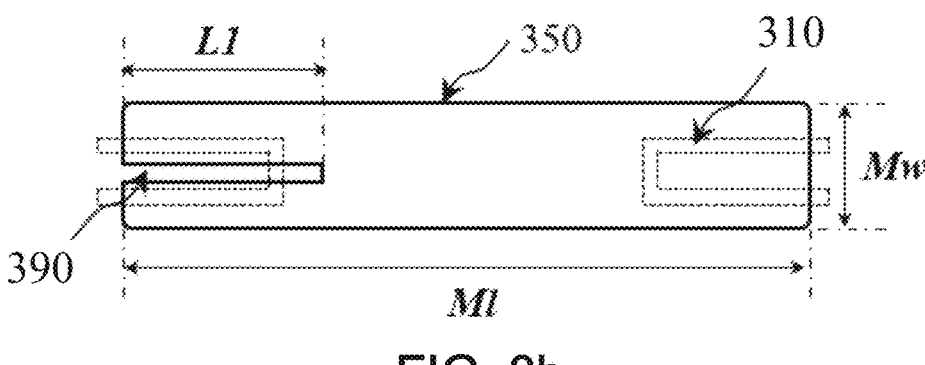
FIGS. 8b-8d show schematic views of slits in at least one of the two end regions of the conducting medium layer of optional embodiments of the present invention.
Figure 8C:
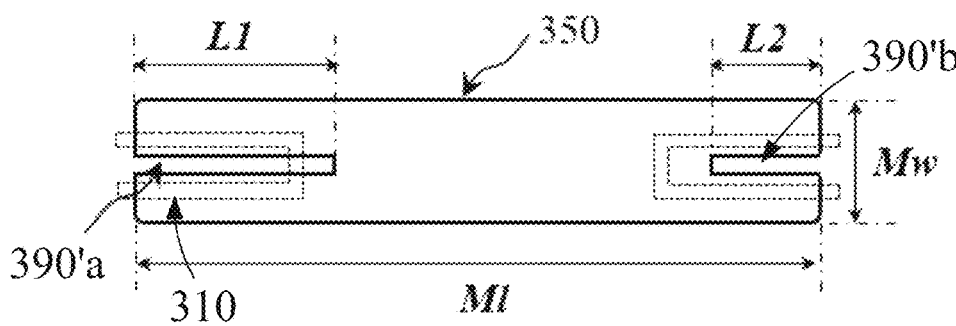
Figure 8D:
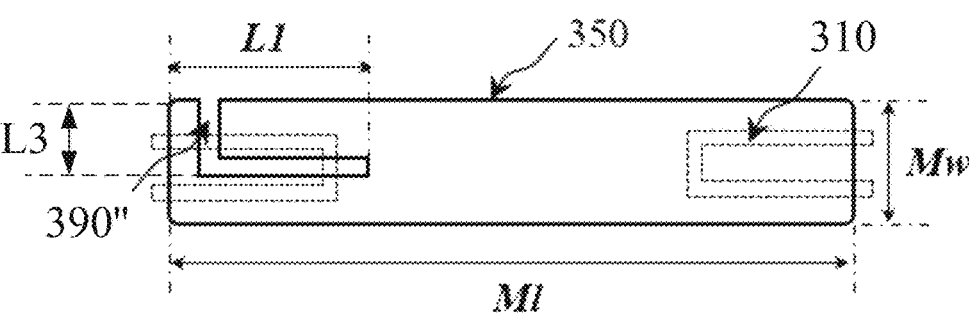

FIG. 8a shows a schematic view of a conducting medium layer in an optional embodiment of the present invention. FIGS. 8b-8d show schematic views of slits in at least one of the two end regions of the conducting medium layer of optional embodiments of the present invention. The circumferential span of the conducting medium layer 350 is MI, and the axial span thereof is Mw. In FIG. 8a, the conducting medium layer 350 is adhered to the outer peripheral surface of the insulating ring 330 and partially surrounds the insulating ring 330. The left end and the right end of the conducting medium layer 350 are close to each other contactlessly and form a slot 360 therebetween. The RFID tag component 400 is formed with such a conducting medium layer 350 along with the insulating ring 330 and the film antenna 300. In FIG. 8b, the slit 390 extends in the circumferential direction by a length of L1 from the left end of the conducting medium layer 350 toward the center of the conducting medium layer 350 and is formed into a rectangle such that the inner (right side in FIG. 8b) end of the slit 390 exceeds the end of the metal loop antenna 310. In FIG. 8c, the slit 390'a is formed as a rectangle with a length of L1 extending in the circumferential direction from the left end of the conducting medium layer 350 toward the center of the conducting medium layer 350, such that the inner (right side in FIG. 8c) end of the slit 390'a exceeds the end of the metal loop antenna 310. The slit 390'b is formed as a rectangle with a length shorter than L1/L2 extending in the circumferential direction from the right end of the conducting medium layer 350 toward the center of the conducting medium layer 350, such that the inner (left side in FIG. 8c) end of the slit 390'b does not exceed the end portion of the metal loop antenna 310. Optionally, as shown in FIG. 8d, the slit 390" extends in the axial direction by a length of L3 from the upper end of the conducting medium layer 350 and then extends in the circumferential direction toward the center of the conducting medium layer 350, such that the distance between the edge of the slit 390" closest to the center of the conducting medium layer 350 and the left end of the conducting medium layer 350 in the circumferential direction is L1, the slit 390" is formed into 'L' shape. In FIGS. 8a-8d, the film antenna 300 on the inner circumferential surface of the insulating ring 330 is partially depicted with dashed lines to schematically show the relative position of the conducting medium layer 350 and the slits therein (slit 390 in FIG. 8b, slit 390'a and slit 390'b in FIG. 8c, slit 390" in FIG. 8d) with respect to the film antenna 300. Although the slits shown in FIGS. 8b-8d have regular shapes, the figures are merely exemplary embodiments, and other shapes of the slits may be contemplated by those skilled in the art as desired. For example, the outer contour of the slit may not necessarily be formed by a straight line, but by a curved line. In FIGS. 8b-8d, the area of the slit and the area surrounded by the film antenna 300 overlap at least partially in the radial direction, but those of ordinary skill in the art will appreciate that the technical effects of the present invention may be achieved even if the area of the slit and the area surrounded by the film antenna 300 do not overlap.

In an embodiment of the present invention, the conducting medium layer 350 may be inductively coupled with the film antenna 300 with a slot 360 between two ends. Such a structure of the conducting medium layer 350 with a slot 360 between two ends makes it possible for the slot 360 to be electrically used as a radiation slot for the RFID tag component 400, while a variation of the slot 360 may be achieved by forming slits in the conducting medium layer 350 (e.g. slits 390, 390'a, 390'b, 390" in FIGS. 8b-8d) which may be used to improve the impedance bandwidth and radiation gain of the radiation antenna (the conducting medium layer 350 acts as) of the RFID tag component 400. As different slits are formed in the conducting medium layer 350, the electric field distribution and the surface current distribution across the conducting medium layer 350 may be changed. Such a variation of the structure of the conducting medium layer 350 may enable changes to the radiation performance of the conducting medium layer 350 and control to the center frequency of the RFID tag component 400 without changing the structure of the existing annular jacket 370 or the circumferential span of the film antenna 300.

Figure 9A:
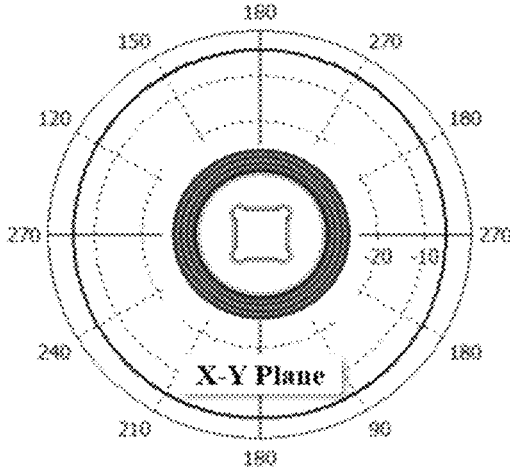
FIGS. 9a and 9b show radiation pattern diagrams in radial direction and axial direction of an RFID tag assembly of an embodiment of the present invention respectively.
Figure 9B:
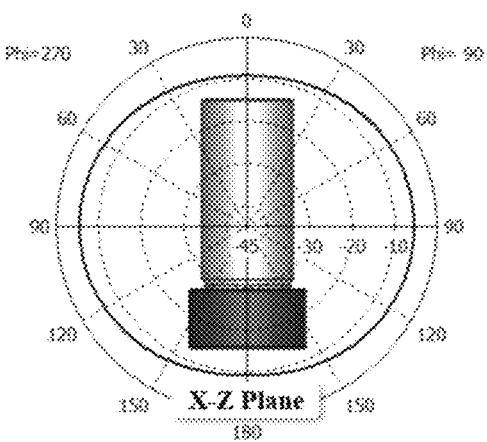

FIG. 9a is the radiation pattern of the RFID tag assembly 200 in the radial plane (X-Y plane) of the tools having a center frequency of 920 MHz when theta=270°, FIG. 9b shows the radiation pattern of the RFID tag assembly 200 in the axial plane (X-Z plane) of the tools having a center frequency of 920 MHz at phi=270°. The direction of maximum radiation gain of the RFID tag assembly using the metal tools themselves as the ground of the RFID tag assembly is outward perpendicular to the attachment surface, however the RFID tag assembly 200 according to embodiments of the present invention may form a uniform radiation pattern within the radial plane (X-Y plane) of the tool 200. In the long-range radiation pattern of the RFID tag assembly in the axial plane (X-Z plane) of the tool 200, there is also little change in the radiation gain in the phi=0° direction and the phi=90° direction. The results show that the identification rate of the RFID tag assembly 200 in arbitrary rotational direction of the tool 200 is significantly improved compared to that of the RFID tag assembly attached to the ground of the metal tools.

Figure 10:
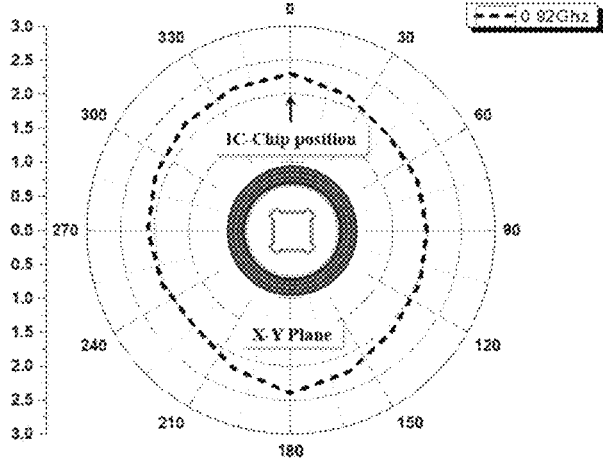
FIG. 10 shows a readable range of an RFID tag assembly in radial direction of a tool of an embodiment of the present invention.

FIG. 10 shows the readable range of an RFID tag assembly in the radial direction of a tool according to an embodiment of the present invention. The measurement may be performed by setting the plane reference angle 0° direction as the direction in which the IC chip 320 of the film antenna 300 is located within the annular jacket 370. In the center frequency band of 920 MHz, the identification range measured in any rotational direction of the tool 200 is about 2 m, and thus isotropy of the RFID tag assembly 200 in any rotational direction of the tool 200 may be exhibited. The film antenna 300 of the RFID tag assembly 200 of the embodiment of the present invention is electromagnetically coupled with the conducting medium layer 350 such that an omni-directional identification pattern is exhibited in the long-range radiation pattern. Such characteristic enables the RFID tag assemblies of the tools to be identified regardless of how they are placed.

So far, an RFID tag assembly has been described. The present invention comprehensively considers the structural and material characteristics of the tools and provides an easily implemented method of sleeving the RFID tag assembly outside the tool. And the RFID tag assembly of the embodiments of the present invention allows the RFID tag component to be completely sealed within the annular jacket by a special adhesive and ultrasonic welding process. The RFID tag assembly is not directly attached to the surfaces of the tools, but is sealed within an annular jacket, thereby solving basic water/dust resistance issues and allowing the RFID tag component to be avoided from exposure to various wash environments and chemical environments of the tools, thereby providing improved durability. In order to make the RFID tag assembly resistant to high temperatures, the film antenna formed by electrically connecting the IC chip and the metal loop antenna may use a PI material as the substrate, and the conducting medium layer serving as a long-range radiator may also optionally use thin Al materials, conductive silver foil materials, or the like. A film antenna and a conducting medium layer for adjusting the electrical performance of the RFID tag assembly are inserted into and sealed within the annular jacket, thereby protecting the RFID tag component from external impacts and drops occurring in the usage environment of tools.

In addition, the RFID tag assembly of the embodiments of the present invention is able to provide uniform identifiable characteristics in all directions in the radial plane of the tools, thereby allowing the reader identification angle to be freely selected in a practical application environment. As such, the characteristics of the RFID tag assembly of the present invention do not vary sensitively as the size of the tool changes. In particular, the RFID tag assembly of the present invention is not sensitive to changes in tag design variables or manufacturing process errors.

Some exemplary embodiments have been described above. However, it should be appreciated that various modifications can be made to the above described exemplary embodiments without departing from the spirit and scope of the invention. For example, if suitable results can be achieved with the described techniques being performed in a different order and/or with components of the described systems, architectures, devices, or circuits combined differently and/or replaced or supplemented by additional components or the equivalents thereof, then accordingly, other modified implementations also fall within the scope of the claims.

We claim:

1. A radio frequency identification (RFID) tag component, comprising:
    an insulating ring;

a film antenna bonded to an inner peripheral surface of the insulating ring, the film antenna formed by connecting an IC chip with a metal loop antenna, the metal loop antenna being flexible such that the film antenna adheres to the inner peripheral surface of the insulating ring along a circumferential direction after being bonded to the inner peripheral surface; and
    a conducting medium layer adhering to an outer peripheral surface of the insulating ring in the circumferential direction and partially surrounding the insulating ring such that there is a slot between two ends of the conducting medium layer, wherein the conducting medium layer is inductively coupled with the metal loop antenna to radiate radio frequency signals from the IC chip outwardly through the slot.

2. The RFID tag component of claim 1, wherein the IC chip is positioned on the film antenna at the center of a portion of the metal loop antenna extending along the circumferential direction.

3. The RFID tag component of claim 1, wherein the IC chip is positioned on the film antenna at the center of a portion of the metal loop antenna extending along an axial direction.

4. The RFID tag component of claim 1, wherein the impedance of the film antenna is able to be changed by adjusting a circumferential span of a portion of the metal loop antenna extending along the circumferential direction and/or an axial span of a portion of the metal loop antenna extending along an axial direction.

5. The RFID tag component of claim 1, wherein an impedance matching between the film antenna and the conducting medium layer is able to be adjusted by adjusting the relative position of the center of the film antenna relative to the slot in the circumferential direction.

6. The RFID tag component of claim 1, wherein the slot on the outer peripheral surface covers the center of the film antenna on the inner peripheral surface in a radial direction.

7. The RFID tag component of claim 1, wherein a circumferential width of the slot does not exceed a half of a circumferential span of the film antenna.

8. The RFID tag component of claim 7, wherein the circumferential width of the slot is in the range of 0.5 mm to 3 mm.

9. The RFID tag component of claim 1, wherein the conducting medium layer has a slit in at least one of two end regions in the circumferential direction thereof on the outer circumferential surface, and an area of the slit on the outer circumferential surface at least partially overlaps in the radial direction with the area on the inner circumferential surface surrounded by the film antenna.

10. The RFID tag component of claim 9, wherein the slit extends a length in the circumferential direction from the end of the conducting medium layer toward the center of the conducting medium layer.

11. The RFID tag component of claim 9, wherein the slit extends a height in the axial direction and a length in the circumferential direction on the conducting medium layer.

12. An RFID tag assembly for adapting tools, comprising:
    the RFID tag component of claim 1, and
    an annular jacket formed of an insulating material, the jacket having an inner layer, an outer layer, and an annular cavity between the inner layer and the outer layer for conformally accommodating the RFID tag component.

13. The RFID tag assembly of claim 12, wherein the annular jacket is configured to enclose a portion of an object to be identified within the inner layer of the annular jacket to mount the RFID tag assembly to the object to be identified.

14. An object to be identified, a portion of which is externally surrounded with the RFID tag assembly of claim 12.

15. The object to be identified of claim 14, wherein the object to be identified includes tools having a symmetrical cross-sectional shape.

\*  \*  \*  \*  \*